O. O. STORLE.
TRANSMISSION CLUTCH AND GEAR.
APPLICATION FILED AUG. 25, 1917.

1,416,074.

Patented May 16, 1922.

Ole O. Storle, INVENTOR

BY

Geo. W. Bullard, ATTORNEY

UNITED STATES PATENT OFFICE.

OLE O. STORLE, OF TACOMA, WASHINGTON.

TRANSMISSION CLUTCH AND GEAR.

1,416,074.   Specification of Letters Patent.   Patented May 16, 1922.

Application filed August 25, 1917. Serial No. 188,219.

*To all whom it may concern:*

Be it known that I, OLE O. STORLE, a citizen of the United States, residing at Tacoma, in the county of Pierce and State of Washington, have invented a new and useful Transmission Clutch and Gear, of which the following is a specification.

My invention relates to improvements in transmission clutches and gears generally used in conjunction with automobiles and other motor driven vehicles: and the objects of my invention are, first, to provide a clutch that can be shifted into prompt engagement without friction on the shaft; second, to secure facilities for proper adjustment of the transmission gears whereby the power may be readily changed to a medium, to a slow or to a reverse movement while all gears are in continuous engagement; and, third, to provide the necessary means for constant lubrication.

I secure these objects by means of the mechanism illustrated in the accompanying drawing in which—

Figure 3:
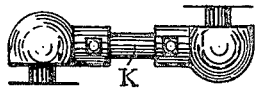
Figure 1:
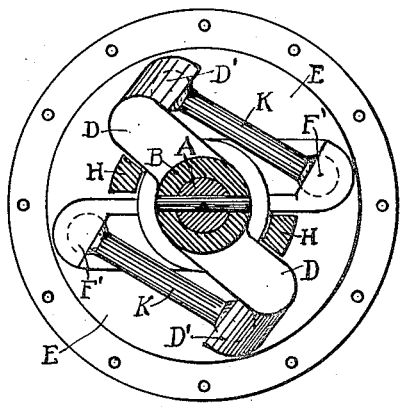
Figure 2:
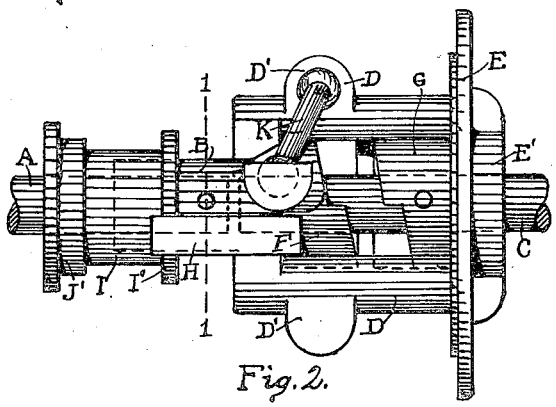
Figure 4:
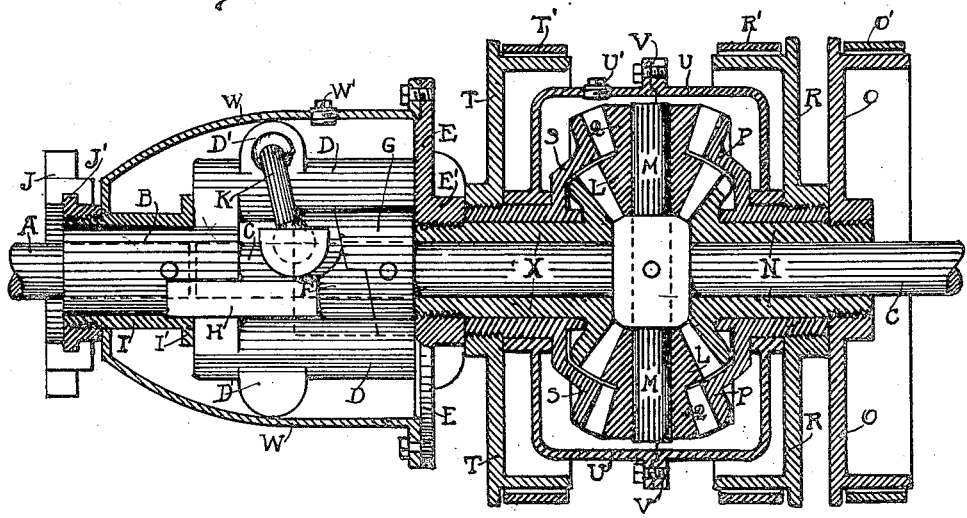

Figure 1 is an end view of the transmission clutch from the section line 1—1; Figure 2 is a side view of Figure 1 showing the clutch disengaged and the necessary shifting sleeve and rim; Figure 3 is view of the ball and socket pins designed to be used in tension instead of compression as shown in Figure 1; and Figure 4 is a side view of Figure 2 showing the clutch engaged with the shifting sleeve and lubricating chamber in section, and also showing a sectional view of the transmission gears with brake wheels and lubricating chamber, all forming a complete operative mechanism.

Similar characters refer to similar parts in the several views.

The engine or driving shaft A, has its end securely fixed within the sleeve B, and by this means the rotary movement is imparted to the transmission clutch and gears and through them to the transmission shaft C, which is in alinement with the driving shaft A. The sleeve B is firmly mounted between two posts or studs, D—D, which extend from a circular base plate E, having a short neck E'. It will be observed the sleeve B, the posts D—D and the circular plate E and neck E' may all be cast in one piece and that they revolve with the driving shaft A.

The direct or fast drive is imparted to the shaft C by the transmission clutch composed of a shifting part F and a fixed part G securely mounted on the shaft C. The shifting part F has two extensions or fingers, H—H, which extend forward and engage the collar I' of the shifting sleeve I which encircles the sleeve B, operated by the shifting lever J, engaging the adjustable collar J' on sleeve I.

The shifting part F of the transmission clutch receives the rotating force through ball and socket push pins K—K, each being finished with ball ends that are fitted into socket extensions F'—F' on opposite sides of the shifting clutch F and similar extensions D' D' from the posts D D, respectively. These ball and socket push pins K K, form a pivotal connection that facilitates the shifting of the clutch in and out of gear without friction.

It is to be observed that I do not limit myself to a ball and socket push pin connection but reserve the right to use sockets on the ends of the pins to fit onto finished ball ends of studs oppositely extended from the sides of the shifting clutch F and the posts D D as indicated in Figure 3, thus putting the pins in tension.

The direct or fast drive is out of gear when the two parts F and G of the clutch are disengaged as seen in Figure 2. With all brakes free on the transmission gears, the driving shaft A and the free and idle mechanism of the transmission clutch and gears will revolve freely around the transmission shaft C which will be stationary. The clutch is thus disengaged.

To apply the direct or fast drive, the part F of the clutch is shifted into engagement with the part G fixed on the transmission shaft C, as shown in Figure 4, which will be made to revolve with the same speed and force as the driving shaft A. During the engagement the transmission gears are to be free and idle and will revolve on and with the shaft C.

The transmission gears are designed to be used for the usual purpose of reducing the speed and increasing the power and are to be operated only when the clutch is disengaged as shown in Figure 2. The driving gear X is loosely mounted on the transmission shaft C, is securely fixed into the neck E' of the circular base plate E and revolves therewith. This driving gear is beveled and engages the bevel pinions L L, mounted on the cross shaft M centrally fixed at right angles on and with the transmission shaft C. Opposite the driving gear X is a similar gear N loosely mounted on the transmission shaft C and likewise engaging the bevel pinions L L. This gear N is to be known as the medium gear and is controlled by the brake wheel O fixed thereon and the brake O' applied thereto. The brake O' when set, holds the gear N stationary and it becomes a fulcrum gear on which the bevel gear pinions L L travel and cause the transmission shaft C to revolve with one-half the speed and double the power as when driven directly by the clutch F G.

To secure a more slow and powerful speed I use the larger bevel gear P which encircles the gear N and is loosely mounted thereon and engages the bevel pinions Q Q, on the outer ends of the bevel pinions L L and are in unison therewith. This bevel gear P is to be known as the slow gear and is controlled by the brake wheel R fixed thereon and the brake R' applied thereto. The brake R' when set, holds the gear P stationary and it becomes a fulcrum gear on which the bevel pinions Q Q are driven by the gear X, meshing the inner bevel pinions L L, and will cause the transmission shaft C to revolve more slowly and with greater power than on the medium gear which during this time must be free and idle.

To secure a reverse turning of the transmission shaft C, I use a duplicate gear S of gear P oppositely mounted thereto, which encircles the driving gear X and is loosely mounted thereon. This bevel gear is to be known as the reverse gear and is controlled by the brake wheel T fixed thereon and the brake T', applied thereto. With gears N and P free, the brake T' when set, will hold the gear S stationary, making it a fulcrum gear on which the pinion bevel gear Q Q will travel and cause the transmission shaft C to revolve oppositely to the driving gear X and with the same speed and power as the slow gear.

The entire group of transmission gears are enclosed within a cylindrical shaped box U, made in two parts and securely bolted together at the central joint V. This box serves the double purpose of a lubricant chamber and of holding the gears and pinions together so they will work perfectly. The screw opening U' is designed for filling the chamber with lubricant when required.

The mechanism of the transmission clutch is enclosed in a cylindrical box W, partly cone shaped with one end bolted to the circular base E. The adjustable collar J' allows the box to be removed. It is to be used as a lubricant chamber, the screw opening W' being used for filling the chamber.

It is to be observed that the several parts of the transmission clutch and gears are so designed that the inclosing boxes may be removed when desired and the parts separated to be repaired or to be replaced with new parts.

Having described my invention, what I claim as new and desire to secure by Letters Patent is:—

1. In a transmission gear and clutch, the combination with drive and transmission shafts, of a gear connected to the transmission shaft to rotate therewith and formed of inner and outer disposed gears, a drive gear sleeved upon the transmission shaft and meshing with the inner disposed gear of the shaft and connected with the drive shaft to be driven therefrom, variable speed gears for idle movement around the transmission shaft and meshing one with the inner and the other with the outer disposed gears of the transmission shaft, means for locking the respective variable speed gears against rotative movement relatively to the transmission shaft, a reversing gear meshing with the outer disposed gear of the transmission shaft and mounted for idle movement, means for locking said gear against idle movement to reverse the direction of rotation of the transmitting shaft when the variable speed gears are free for idle movement, and means for effecting locking connection between the transmission shaft drive gear and the drive shaft.

2. In a transmission gear and clutch, the combination with drive and transmission shafts, of a gear connected to the transmission shaft to rotate therewith, variable speed gears meshing with the transmission shaft gear and mounted for idle movement around the transmission shaft, means for locking the respective variable speed gears against rotative movement relatively to the transmission shaft, a reversing gear meshing with the transmission shaft gear and mounted for idle movement relatively to said shaft, means for locking said gear against idle movement, means for effecting locking connection between the drive gear and the drive shaft, and a clutch for effecting a locking connection between the transmission shaft and the drive shaft, said clutch having one of its members provided with a pivotal connection to the means which effect a locking connection between the drive gear and the drive shaft.

3. In a transmission gear and clutch, the combination with drive and transmission shafts, of a gear connected with the transmission shaft, variable speed gears and a reversing gear meshing with said transmission shaft gear and each mounted for idle movement, means for locking each of said gears against idle movement, as desired, a drive gear sleeved upon the transmission shaft and meshing with the transmission shaft gear, and a clutch for effecting a locking connection between the transmission shaft, the sleeved drive gear and the drive shaft, said clutch comprising a rotative member and a sliding clutch member having a pivotal connection one with the other.

OLE O. STORLE.